United States Patent Office 3,342,791
Patented Sept. 19, 1967

3,342,791
N-ACYL-ACRYLOXYALKANAMIDES, POLYMERS THEREOF AND METHODS OF MAKING THEM AND THEIR POLYMERS
Everett J. Kelley, Moorestown, N.J., assignor to Rohm & Haas Company, Philadelphia, Pa., a corporation of Delaware
No Drawing. Filed Dec. 11, 1964, Ser. No. 417,827
13 Claims. (Cl. 260—86.1)

The present invention concerns N-acyl-acryloxyalkanamides, polymers thereof and methods of making them and their polymers.

The novel monomeric compounds of the present invention have the formula

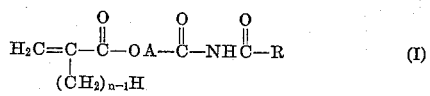

wherein $n$ is an integer having a value of 1 to 2,
A is an alkylene group having 1 to 3 carbon atoms, and
R is selected from the group consisting of H and alkyl groups having 1 to 3 carbon atoms.

The products of Formula I are white solids or colorless liquids which are soluble in lower alcohols, such as methanol, ethanol, isopropanol; in mixtures of water and the lower alcohols; in ketones, such as acetone, ethyl isopropyl ketone; in ethers such as ethyl ether, dioxane, the monomethyl and monoethyl ethers of ethylene glycol; in esters, such as amyl acetate; in nitroalkanes, such as nitroethane; in dimethylformamide and dimethylacetamide; in hydrocarbons such as toluene and xylenes; in chlorinated hydrocarbons, such as ethylene dichloride, chloroform, and carbon tetrachloride.

The monomers of Formula I may be made in various ways. In a preferred embodiment, an N-acyl-halogenoacylamide of Formula II is reacted with an alkali metal salt of an acrylate of Formula III

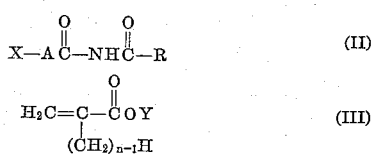

wherein $n$, A, and R are as defined hereinabove,
X is a halogen atom, preferably chlorine or bromine, and
Y is an alkali metal, such as sodium, potassium, or lithium.

In this reaction, equimolar amounts of the compounds of Formulas II and III are generally used. However, an excess of the acrylic acid or methacrylic acid salt of Formula III may be present, if desired. The reaction is effected in an inert solvent, that is one that is inert to the reactants. The reactants may be introduced all at once into the solvent or one may be added after the other all at once or in a gradual manner. As solvents, there may be used acetonitrile, dimethylformamide, dioxane, t-butanol, benzene, dimethyl ether of diethylene glycol, and dimethyl sulfoxide. Of these, acetonitrile is preferred because it provides a rapid reaction, it is easily removed after completion of the reaction, and there is little risk of polymerization during reaction. The reaction mixture is heated between 50 and 130° C., preferably at reflux, for a period of 4 to 24 hours. Optionally, there may be added a polymerization inhibitor in an amount of 0.05 to 1% based on the total weight of the reactants. Suitable inhibitors include hydroquinone, the ethers thereof, such as its monomethyl ether, di-β-naphthol, and benzyltrimethylammonium salicylate. While it is not necessary to include the inhibitor, it is generally preferred to do so. Optionally but preferably, a catalyst for the reaction of II and III may be included in an amount of about 0.5 to 3% by weight on the total weight of the reactants. As catalysts, there may be used tertiary amines that quaternize readily, such as trimethylamine, benzyldimethylamine, pyridine or N-methyl pyrrolidine. Instead of tertiary amines, there may be used as catalysts various quaternary ammonium compounds, such as the benzyltrimethylammonium chloride, sulfate, methoxide, acetate, butoxide, salicylate, and so on, a corresponding tetramethylammonium chloride, sulfate, and so on, also choline, choline methoxide, as well as others. The use of benzyltrimethylammonium salicylate serves to provide both a catalytic function and a polymerization-inhibiting function.

The compounds of Formula II are generally known but may be prepared from the appropriate haloalkanamide of Formula IV and carboxylic acid anhydride of Formula V thus

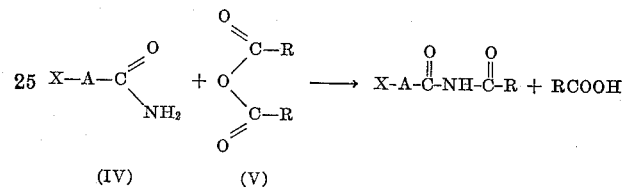

wherein X, A, and R are as defined hereinbefore, except R can not be hydrogen in this method.

In this reaction of Compounds IV and V, about equimolar proportions of the two reactants may be used although an excess such as a 50% molar excess, of the anhydride is generally preferred. No catalyst is needed, but it can be used to hasten the reaction. As a catalyst, there may be used any source of chloride anion, such as HCl, or an acyl chloride, e.g. acetylchloride. The amount of catalyst may be from 1 to 7%, preferably about 5% based on the weight of chloroacylamide. The mixture of the reactants with or without the catalyst is heated to 50° to 160° C., preferably at reflux, for about 1 to 8 hours the length of time depending on whether or not a catalyst is used. When the product, on cooling the reaction mass, precipitates as a white solid, it may be isolated by filtration. Purification in that case may be effected by recrystallizing from a suitable solvent, such as benzene, toluene, xylene. When the product is a liquid, it may be recovered by distilling off the by-product acid at atmospheric or reduced pressure. Examples of compounds of Formula IV include α-chloroacetamide, β-chloropropionamide, and γ-chlorobutyramide. Examples of compounds of Formula V include acetic anhydride, propionic anhydride, and butyric anhydride.

As a chemical intermediate, the compounds of the present invention are adapted to react at the double bond with various compounds including alcohols, mercaptans, primary or secondary amines, nitroalkanes, malonates, acetoacetates, sodium bisulfite, and so on. The addition of long chain amines or mercaptans, such as dodecylamine or mercaptan, provides compounds which are highly useful as water-proofing, softening and lubricating agents for textiles of all types and especially of cellulosic type including rayon and cotton, for leather and for paper.

The compounds of Formula I may be polymerized or copolymerized in bulk, in solution, or in either an emulsion or suspension technique to produce various types of polymers including the granular type. Solution polymerization may be effected in such solvents as water, dimethylformamide or other of the solvents mentioned above in which the compounds of Formula I and any comonomers that may be used are suitably soluble. The compounds of Formula I may be copolymerized with or without other water-insoluble monomers by an emulsion technique in which the comonomers and the compound of Formula I are emulsified by non-ionic, cationic, or anionic emulsifiers or suitable mixtures thereof.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis($\alpha,\gamma$-dimethylvaleronitrile), azobis($\alpha$-methylbutyronitrile), azobis($\alpha$-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxy-polyethoxyethanols in which the alkyl group has from 6 to 18 carbon atoms, such as octyl, dodecyl, or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octyl-benzyl)-trimethylammonium chloride, and so on.

Examples of vinylidene or monoethylenically unsaturated compounds that may be copolymerized with the compound of Formula I include vinylpyridines, such as 2-vinylpyridines and 4-vinylpyridines, acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene and its homologues and analogues, vinylpyridine, vinylcarbazole, and allyl esters of monocarboxylic acids. Specific vinylidene compounds are methyl, ethyl, isopropyl, butyl, tert-butyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, dimethylaminoethyl acrylate or methacrylate, tert-butylaminoethyl acrylate or methacrylate, dimethylaminopropyl acrylate or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, $\alpha$-methylstyrene, p-methylstyrene, p-chlorostyrene, vinylnaphthalene, etc. When two or more free radical-polymerizable vinylidene groups occur, as in divinylbenzene, trivinylbenzene, ethylene diacrylate or methacrylate, bis(vinyloxyethyl)urea, or vinyloxyethyl acrylate methacrylate, insoluble interpolymers result.

Copolymers may contain ½ to 99½% of at least one monomer of Formula I, and serve well as clear or pigmented coating compositions for all sorts of substrates, to which they have outstanding adhesion including textiles, leather, paper, wood, glass, plastic or metals, such as steel, aluminum, brass, and copper. Thus copolymers containing from 0.5% to 20% by weight or more of the compounds of Formula I with various comonomers are adapted to provide valuable coating materials which may be pigmented or not and in the case of emulsion copolymers, they are adapted to provide valuable water-base paints. Copolymers containing from 0.5% to 20% by weight of a compound of Formula I with ethyl acrylate, butyl acrylate, or the like, are useful to reduce the shrinkage of wool. For this purpose, they may be applied in aqueous dispersions of a concentration from 10% to 30% so that from about 5% to 15% by weight of the copolymer is deposited on the wool fabric. After drying, the treated fabric may be heated to 240° F. to 350° F. from a period of one-half to fifteen minutes. Similar aqueous dispersions made by the emulsion copolymerization of a monomer of Formula I with acrylic esters and especially butyl acrylate or ethyl acrylate are useful, with or without pigment, for the primary coating of leather. Copolymers with acrylonitrile, especially those containing from 75% to 90% of acrylonitrile, with a compound of Formula I provide useful fiber- and film-forming materials which are adapted to be spun or cast to form fibers and films which are characterized by improved receptivity toward dyes. Copolymers of a compound of Formula I with acrylic acid or methacrylic acid or copolymers thereof with a vinylpyridine, when included in melts or solutions of polymers of acrylonitrile containing 75% to 90% acrylonitrile, such as copolymers thereof with vinyl chloride, vinyl acetate, or the like, serve to modify the dyeing properties of fibers and films formed therefrom.

To assist those skilled in the art to practice the present invention, the following modes of operation are suggested by way of illustration, parts and percentages being by weight unless otherwise specifically noted.

(1) *Preparation of N-acetyl-α-methacryloxyacetamide*

(a) A quantity of the intermediate N-acetyl-α-chloroacetamide is prepared by refluxing α-chloroacetamide with acetic anhydride (mole ratio 1:1.5) in the presence of acetyl chloride (10 cc. per mole of chloroamide) catalyst. The reaction mixture is treated with ether to precipitate the crude product which is recrystallized from benzene and melts at 110–111° C.

*Analysis.*—Percent nitrogen found 10.3, calc. 10.3, percent chlorine found 25.8, calc. 26.2.

(b) The monomer, N-acetyl-α-methacryloxyacetamide is then prepared by heating equimolar amounts of the N-acetyl-α-chloroacetamide (85 gms., 0.62 mole) and sodium methacrylate (67 gms., 0.62 mole) using acetonitrile (310 gms.) as solvent, choline chloride (4.6 gms. of 70% aqueous solution) catalyst and para-methoxyphenol (0.56 gm.) as polymerization inhibitor. The mixture is refluxed (82° C.) for five hours, cooled to 50–55° C., and filtered to remove NaCl. The NaCl filter cake is washed with a little acetonitrile and the combined filtrates distilled under reduced pressure to strip off acetonitrile, leaving a 131 gm. dark viscous residue. Water (175 gms.) is added to the residue to speed crystallization. The precipitate is filtered and rewashed with water to give crude, wet, desired product which is purified by recrystallization from an ethanol-water mixture followed by vacuum drying to give a white solid, M.P. 74–77.

*Analysis.*—Bromine No. (m. eq. Br/gm. sample); found 10.5, calc. 10.8.

(c) Part (b) is repeated using 60 g. of sodium acrylate whereby N-acetyl-α-acryloxyacetamide is obtained.

(2) (a) In similar fashion (see (1)(a) above) N-propionyl-α-chloroacetamide may be prepared by refluxing α-chloroacetamide with propionic anhydride in the presence of propionyl chloride catalyst, precipitating with ether and recrystallization from benzene.

(b) Likewise N-butyryl-α-chloroacetamide may be prepared from α-chloroacetamide and butyric anhydride, using butyryl chloride as catalyst.

(c) Similarly, N-acetyl-β-chloropropionamide may be prepared from β-chloropropionamide and acetic anhydride, using acetyl chloride as a catalyst.

(d) In a similar way, N-acetyl-α-chloropropionamide may be prepared from α-chloropropionamide and acetic anhydride, using acetyl chloride as catalyst.

(e) Similarly, N-acetyl-ω-bromobutyramide may be made from ω-bromobutyramide and acetic anhydride, using acetyl bromide as a catalyst.

(f) Procedure (1)(b) is repeated substituting 0.62 mole of N-propionyl-α-chloroacetamide for the N-acetyl-α-chloroacetamide, thereby producing N-propionyl-α-methacryloxyacetamide.

(g) N-butyryl-α-acryloxyacetamide may be obtained by repeating procedure (1)(c) but replacing the N-acetyl-α-chloroacetamide with 0.62 mole of N-butyryl-α-chloroacetamide.

(h) N-acetyl-β-(methacryloxy)propionamide may be obtained by repeating procedure (1)(b) with 0.62 mole of N-acetyl-β-chloropropionamide instead of N-acetyl-α-chloroacetamide.

(i) The procedure of (1)(b) is repeated using 0.62 mole of N-acetyl-α-chloropropionamide in place of the N-acetyl-α-chloroacetamide in order to produce N-acetyl-α-(methacryloxy)-propionamide.

(j) In order to produce N-acetyl-ω-(acryloxy)-butyramide, the process of (1)(c) may be repeated using 0.62 mole N-acetyl-ω-bromobutyramide in place of the N-acetyl-α-chloroacetamide.

(3) *Preparation of solution polymers*

(a) Toluene (233 gms.) is charged to a glass polymerization flask equipped with a stirrer, reflux condenser, thermometer, and dropping funnel. The toluene is stirred and heated to 110° C. A monomer-catalyst solution consisting of the following materials:

|  | Grams |
|---|---|
| n-Butyl methacrylate | 203.7 |
| Methyl methacrylate | 135.8 |
| N-acetyl-α-methacryloxyacetamide | 10.5 |
| Azobisisobutyronitrile | 1.4 | is then added to the flask at an even rate over a two-hour period with continued stirring and heating at 110–115° C. A catalyst solution of 1.92 gms. of azobisisobutyronitrile in 53 gms. of toluene is then added to the batch in three equal portions, two, three, and four hours after the addition of the monomer mixture is completed. The mixture is heated an additional two hours, cooled, and diluted with more toluene (180 gms.). The final solution contains about 40% solids and has a Brookfield viscosity of 260 cps. at 25° C.

(b) The procedure of part (a) hereof is repeated using the following monomer-catalyst mixture:

|  | Grams |
|---|---|
| Methyl methacrylate | 105 |
| Acrylonitrile | 193 |
| Ethyl acrylate | 35 |
| N-acetyl-β-methacryloxypropionamide | 7 |
| Azobisisobutyronitrile | 1.5 |

(c) A solution copolymer is prepared by the procedure of part (a) hereof using the following monomer/catalyst mixture:

|  | Grams |
|---|---|
| Methyl methacrylate | 140 |
| Styrene | 105 |
| n-Butyl acrylate | 70 |
| Methacrylic acid | 3 |
| N-butyryl-α-acryloxyacetamide | 32 |
| Azobisisobutyronitrile | 1.2 |

(4) Each of the above 40% solids copolymer solutions of (3) (a), (b), and (c) are coated on vapor-degreased cold-rolled steel panels, air-dried, and then baked 30 minutes at 150° C. The coatings adhere well under both wet and dry conditions.

(5) *Preparations of emulsion polymers*

(a) To a one-liter, three-neck, round-bottom flask fitted with a reflux condenser, thermometer, Teflon blade agitator, and nitrogen inlet there are charged water (570 gms.), t-octylphenoxypoly(40)ethoxyethanol (17 gms. of 70% solution), ethyl acrylate (132 gms.), methyl methacrylate (64 gms.), and N-acetyl-α-methacryloxyacetamide (4 gms.) in that order. The system is swept with nitrogen and the temperature adjusted to 15° C. with an ice bath. Polymerization is initiated by the addition of freshly prepared solutions of ammonium persulfate (0.2 gm. in 10 mls. $H_2O$), sodium hydrosulfite (0.2 gms. in 10 mls. $H_2O$), and ferrous sulfate (2.0 mls. of 0.1% aqueous solution of $FeSO_4 \cdot 7H_2O$) in the given sequence. The polymerization exotherm carries the batch temperature to about 60° C. in 30 minutes. When the batch temperature drops 10° C. (air cooling only), an ice bath is applied and the dispersion cooled to room temperature. The dispersion solids at this time is about 25% and is increased to 43.4% by evaporation. The dispersion pH is then adjusted to 9.6 by the addition of conc. $NH_4OH$.

(b) Part (a) hereof is repeated except that the monomers are replaced with:

|  | Grams |
|---|---|
| n-Butyl acrylate | 116 |
| Methyl methacrylate | 74 |
| Methacrylic acid | 3 |
| N-acetyl-α-acryloxyacetamide | 7 |

(c) Part (a) hereof is repeated except that the monomers are replaced with:

|  | Grams |
|---|---|
| Acrylonitrile | 110 |
| Ethyl acrylate | 70 |
| Methacrylamide | 3 |
| N-methylolacrylamide | 5 |
| Acrylic acid | 2 |
| N-acetyl-ω-acryloxybutyramide | 10 |

(6) Each of the copolymer dispersions (about 43% solids) of (5)(a),(b), and (c) are coated on clean sanded white pine panels and on vapor-degreased cold-rolled steel panels and then air-dried 20 hours. The coatings adhered well to both wood and steel substrates.

The adhesion to surfaces of wood, steel, etc. obtained in coatings made with the copolymers of the present invention is surprising since copolymers of analogous composition but containing α-acryloxyacetamide units instead of the N-acetyl substituted groups of the present invention generally lack this adhesion quality.

I claim:
1. A compound of the formula

$$H_2C=C(-(CH_2)_{n-1}H)-\overset{O}{\overset{\|}{C}}-OA-\overset{O}{\overset{\|}{C}}-NH\overset{O}{\overset{\|}{C}}-R \qquad (I)$$

wherein $n$ is an integer having a value of 1 to 2,
A is an alkylene group having 1 to 3 carbon atoms, and
R is selected from the group consisting of H and alkyl groups having 1 to 3 carbon atoms.

2. An addition polymer of a compound of the formula $$H_2C=C(-(CH_2)_{n-1}H)-\overset{O}{\overset{\|}{C}}-OA-\overset{O}{\overset{\|}{C}}-NH\overset{O}{\overset{\|}{C}}-R \qquad (I)$$

wherein $n$ is an integer having a value of 1 to 2,
A is an alkylene group having 1 to 3 carbon atoms, and
R is selected from the group consisting of H and alkyl groups having 1 to 3 carbon atoms.

3. An addition copolymer of ethylenically unsaturated molecules comprising (1) at least one compound of the formula $$H_2C=C(-(CH_2)_{n-1}H)-\overset{O}{\overset{\|}{C}}-OA-\overset{O}{\overset{\|}{C}}-NH\overset{O}{\overset{\|}{C}}-R \qquad (I)$$

wherein $n$ is an integer having a value of 1 to 2,
A is an alkylene group having 1 to 3 carbon atoms, and
R is selected from the group consisting of H and alkyl groups having 1 to 3 carbon atoms, and (2) at least one other copolymerizable ethylenically unsaturated monomer.

4. An addition copolymer of about ½ to 99½% by weight of at least one compound of the formula $$H_2C=C(-(CH_2)_{n-1}H)-\overset{O}{\overset{\|}{C}}-OA-\overset{O}{\overset{\|}{C}}-NH\overset{O}{\overset{\|}{C}}-R \qquad (I)$$

wherein $n$ is an integer having a value of 1 to 2,
A is an alkylene group having 1 to 3 carbon atoms, and
R is selected from the group consisting of H and alkyl groups having 1 to 3 carbon atoms, and the balance to make 100% of at least one other copolymerizable monoethylenically unsaturated monomer.

5. N-acetyl-α-methacryloxyacetamide.

6. An addition polymer of N-acetyl-α-methacryloxyacetamide.

7. An addition copolymer of ethylenically unsaturated molecules comprising N-acetyl-α-methacryloxyacetamide and at least one other copolymerizable ethylenically unsaturated monomer.

8. An addition copolymer of about ½ to 99½% by weight of N-acetyl-α-methacryloxyacetamide and the balance to make 100% of at least one other copolymerizable monoethylenically unsaturated monomer.

9. N-acetyl-α-acryloxyacetamide.

10. An addition polymer of N-acetyl-α-acryloxyacetamide.

11. An addition copolymer of ethylenically unsaturated molecules comprising N-acetyl-α-acryloxyacetamide and at least one other copolymerizable ethylenically unsaturated monomer.

12. An addition copolymer of about ½ to 99½% by weight of N-acetyl-α-acryloxyacetamide and the balance to make 100% of at least one other copolymerizable monoethylenically unsaturated monomer.

13. A method of producing a compound of the formula $$H_2C=C(-(CH_2)_{n-1}H)-\overset{O}{\overset{\|}{C}}-OA-\overset{O}{\overset{\|}{C}}-NH\overset{O}{\overset{\|}{C}}-R \qquad (I)$$

wherein $n$ is an integer having a value of 1 to 2,
A is an alkylene group having 1 to 3 carbon atoms, and
R is selected from the group consisting of H and alkyl groups having 1 to 3 carbon atoms, which comprises reacting a compound of formula II with a compound of formula III, formulas II and III being as follows:

$$X-A\overset{O}{\overset{\|}{C}}-NH\overset{O}{\overset{\|}{C}}-R \qquad (II)$$

$$H_2C=C(-(CH_2)_{n-1}H)-\overset{O}{\overset{\|}{C}}-OY \qquad (III)$$

wherein $n$, A, and R are as defined hereinabove,
X is a halogen atom, and
Y is an alkali metal.

No references cited.

JOSEPH L. SCHOFER, *Primary Examiner.*

H. WONG, *Assistant Examiner.*